United States Patent
Gonzales et al.

(10) Patent No.: US 7,289,764 B2
(45) Date of Patent: Oct. 30, 2007

(54) CARDHOLDER INTERFACE FOR AN ACCESS CONTROL SYSTEM

(75) Inventors: Eric V. Gonzales, Aurora, IL (US); Ronald Taylor, Wheaton, IL (US); James F. Wiemeyer, Homer Glen, IL (US)

(73) Assignee: Harrow Products, LLC, Montvale, NJ (US)

( * ) Notice: Subject to any disclaimer, the term of this patent is extended or adjusted under 35 U.S.C. 154(b) by 207 days.

(21) Appl. No.: 10/262,509

(22) Filed: Sep. 30, 2002

(65) Prior Publication Data

US 2003/0117263 A1 Jun. 26, 2003

Related U.S. Application Data

(60) Provisional application No. 60/326,338, filed on Sep. 30, 2001, provisional application No. 60/326,299, filed on Sep. 30, 2001, provisional application No. 60/326,201, filed on Sep. 30, 2001, provisional application No. 60/326,316, filed on Sep. 30, 2001, provisional application No. 60/326,298, filed on Sep. 30, 2001, provisional application No. 60/326,179, filed on Sep. 30, 2001, provisional application No. 60/326,296, filed on Sep. 30, 2001, provisional application No. 60/326,294, filed on Sep. 30, 2001, provisional application No. 60/326,295, filed on Sep. 30, 2001.

(51) Int. Cl.
*H04B 7/00* (2006.01)

(52) U.S. Cl. .............. 455/41.2; 455/528; 455/461; 455/26.1; 455/558; 340/5.61; 340/825.54; 340/426.25; 711/5; 711/167; 711/103; 709/212; 709/226; 370/321; 370/354; 370/438

(58) Field of Classification Search ............. 455/41.2, 455/26.1, 528, 461, 558; 340/426.25, 825.5, 340/426.24, 505, 517, 5.61, 825.54, 5.6; 370/328, 321, 354, 438; 711/167, 5, 103; 709/226, 212, 213

See application file for complete search history.

(56) References Cited

U.S. PATENT DOCUMENTS 528,589 A 11/1894 Brownell et al.

(Continued)

FOREIGN PATENT DOCUMENTS

FR 2749607 12/1997

(Continued)

OTHER PUBLICATIONS

"Circuit Design for Electronic Instrumentation" by Darold Wobschall, pp. 367-369.

*Primary Examiner*—Marceau Milord
(74) *Attorney, Agent, or Firm*—Michael Best & Friedrich LLP

(57) ABSTRACT

In a wireless access control system, a method and system for providing indications of the state of a Wireless Access Point Module (WAPM) to an observer using at least one indicator mounted on the WAPM. The WAPM preferably provides indications of the version number of the software installed on the WAPM. Additionally, the WAPM may communicate with a WPIM. The WAPM may indicate that it is attempting to establish communication with said WPIM, is engaged in an error test with said WPIM, or has lost communication with said WPIM, for example.

20 Claims, 4 Drawing Sheets

U.S. PATENT DOCUMENTS

| | | | |
|---|---|---|---|
| 1,946,384 A | 2/1934 | Baril et al. | |
| 3,967,478 A | 7/1976 | Guinn | |
| 4,048,630 A | 9/1977 | Deming et al. | |
| 4,357,601 A | 11/1982 | McWilliams | |
| 4,539,555 A | 9/1985 | Tefka | |
| 4,557,121 A | 12/1985 | Charlton | |
| 4,579,376 A | 4/1986 | Charlton | |
| 4,634,155 A | 1/1987 | Geringer et al. | |
| 4,672,365 A | 6/1987 | Gehman et al. | |
| 4,677,834 A | 7/1987 | Hicks | |
| D306,806 S | 3/1990 | Hill | |
| 4,967,478 A | 11/1990 | Sherman | |
| 5,009,456 A | 4/1991 | Eck | |
| 5,019,803 A | 5/1991 | Maram | |
| 5,075,608 A | 12/1991 | Erdman et al. | |
| 5,095,654 A | 3/1992 | Eccleston | |
| 5,148,691 A | 9/1992 | Wallden | |
| 5,184,349 A * | 2/1993 | Riordan | 370/347 |
| 5,263,347 A | 11/1993 | Allbaugh et al. | |
| 5,308,131 A | 5/1994 | Galindo et al. | |
| 5,313,812 A | 5/1994 | Eklund et al. | |
| 5,410,444 A | 4/1995 | Juds | |
| 5,418,839 A | 5/1995 | Knuth et al. | |
| RE35,124 E | 12/1995 | Erdman et al. | |
| 5,475,375 A | 12/1995 | Barrett et al. | |
| 5,479,151 A | 12/1995 | Lavelle et al. | |
| 5,491,471 A * | 2/1996 | Stobbe | 340/5.61 |
| 5,497,411 A * | 3/1996 | Pellerin | 455/411 |
| 5,531,086 A | 7/1996 | Bryant | |
| 5,577,229 A * | 11/1996 | Wakerly | 711/147 |
| 5,602,536 A | 2/1997 | Henderson et al. | |
| 5,608,298 A | 3/1997 | Frolov et al. | |
| 5,611,582 A | 3/1997 | Frolov et al. | |
| 5,630,169 A * | 5/1997 | Jackson | 710/5 |
| 5,682,135 A | 10/1997 | LaBonde et al. | |
| 5,683,127 A | 11/1997 | Chamberlain | |
| 5,705,991 A | 1/1998 | Kniffin et al. | |
| 5,722,276 A | 3/1998 | Aigner et al. | |
| 5,729,198 A | 3/1998 | Gorman | |
| 5,769,472 A | 6/1998 | Small | |
| 5,774,059 A * | 6/1998 | Henry et al. | 340/5.54 |
| 5,791,178 A | 8/1998 | Chamberlain et al. | |
| D397,993 S | 9/1998 | Jimenez | |
| 5,808,296 A | 9/1998 | McMonagle et al. | |
| 5,812,782 A * | 9/1998 | Jackson | 709/226 |
| 5,847,662 A | 12/1998 | Yokota et al. | |
| 5,867,095 A | 2/1999 | Klein et al. | |
| 5,881,055 A | 3/1999 | Kondo | |
| 5,884,145 A | 3/1999 | Haartsen | |
| 5,901,361 A | 5/1999 | Luong | |
| 5,933,086 A | 8/1999 | Tischendorf et al. | |
| 5,936,544 A | 8/1999 | Gonzales et al. | |
| 5,940,771 A | 8/1999 | Gollnick et al. | |
| 5,948,102 A * | 9/1999 | Wuidart | 726/23 |
| 5,974,367 A * | 10/1999 | Bianco | 340/5.21 |
| 6,021,477 A * | 2/2000 | Mann | 711/167 |
| 6,035,676 A | 3/2000 | Hudspeth | |
| 6,038,896 A | 3/2000 | Chamberlain et al. | |
| 6,067,297 A | 5/2000 | Beach | |
| 6,076,385 A | 6/2000 | Pedroso et al. | |
| 6,108,188 A * | 8/2000 | Denison et al. | 361/160 |
| 6,167,251 A | 12/2000 | Segal et al. | |
| 6,167,934 B1 | 1/2001 | Debroche | |
| 6,185,415 B1 * | 2/2001 | Boatwright | 455/410 |
| 6,189,351 B1 | 2/2001 | Eagan et al. | |
| 6,212,175 B1 | 4/2001 | Harsch | |
| 6,237,028 B1 * | 5/2001 | Jackson | 709/214 |
| 6,259,352 B1 | 7/2001 | Yulkowski et al. | |
| 6,260,392 B1 * | 7/2001 | Geiger | 70/276 |
| 6,285,295 B1 | 9/2001 | Casden | |
| 6,297,725 B1 | 10/2001 | Tischendorf et al. | |
| 6,326,754 B1 | 12/2001 | Mullet et al. | |
| 6,330,817 B1 | 12/2001 | Frolov | |
| 6,347,486 B1 | 2/2002 | Badillet | |
| 6,352,202 B2 | 3/2002 | Takiguchi et al. | |
| 6,359,547 B1 * | 3/2002 | Denison et al. | 340/5.73 |
| 6,377,608 B1 | 4/2002 | Zyren | |
| 6,392,537 B1 * | 5/2002 | Tazumi et al. | 340/507 |
| 6,397,061 B1 | 5/2002 | Jordan et al. | |
| RE37,784 E | 7/2002 | Fitzgibbon et al. | |
| 6,434,985 B1 | 8/2002 | Walmsley | |
| 6,535,136 B1 * | 3/2003 | Rodenbeck et al. | 340/686.6 |
| 6,624,750 B1 | 9/2003 | Marman et al. | |
| 6,657,976 B1 | 12/2003 | Larghi | |
| 6,658,328 B1 * | 12/2003 | Alrabady et al. | 701/1 |
| 6,665,520 B2 | 12/2003 | Romans | |
| 6,714,118 B1 | 3/2004 | Frolov et al. | |
| 6,776,332 B2 | 8/2004 | Allen et al. | |
| 6,778,099 B1 | 8/2004 | Meyer et al. | |
| 6,801,134 B1 * | 10/2004 | Juzswik | 340/825.69 |
| 6,828,902 B2 | 12/2004 | Casden | |
| 6,879,259 B1 | 4/2005 | Smith et al. | |
| 6,894,609 B2 * | 5/2005 | Menard et al. | 340/531 |
| 6,956,840 B1 | 10/2005 | Proctor, Jr. | |
| 6,958,976 B2 | 10/2005 | Kikkawa et al. | |
| 2001/0021639 A1 | 9/2001 | Kaku | |
| 2001/0055283 A1 | 12/2001 | Beach | |
| 2002/0163430 A1 | 11/2002 | Bergman et al. | |
| 2002/0177473 A1 | 11/2002 | Skinner et al. | |
| 2002/0180582 A1 * | 12/2002 | Nielsen | 340/5.6 |
| 2003/0025082 A1 | 2/2003 | Brewington et al. | |
| 2003/0096607 A1 | 5/2003 | Taylor | |
| 2003/0098778 A1 | 5/2003 | Taylor et al. | |
| 2003/0098779 A1 | 5/2003 | Taylor et al. | |
| 2003/0100266 A1 | 5/2003 | Wiemeyer et al. | |
| 2003/0103472 A1 | 6/2003 | Taylor et al. | |
| 2003/0143956 A1 | 7/2003 | Taylor | |
| 2004/0236547 A1 | 11/2004 | Rappaport et al. | |
| 2005/0003812 A1 | 1/2005 | Gladwin et al. | |

FOREIGN PATENT DOCUMENTS

| | | |
|---|---|---|
| WO | WO 02/25040 | 3/2002 |

* cited by examiner

CARDHOLDER INTERFACE FOR AN ACCESS CONTROL SYSTEM

RELATED APPLICATIONS

The present application claims priority to the following provisional applications all filed Sep. 30, 2001: Application No. 60/326,338, entitled "RF Channel Linking Method and System"; Application No. 60/326,299, entitled "Energy Saving Motor-Driven Locking Subsystem"; Application No. 60/326,201 entitled "Cardholder Interface for an Access Control System"; Application No. 60/326,316, entitled "System Management Interface for Radio Frequency Access Control"; Application No. 60/326,298 entitled "Power Management for Locking System"; Application No. 60/326,179, entitled "General Access Control Features for a RF Access Control System"; Application No. 60/326,296, entitled "RF Wireless Access Control for Locking System"; Application No. 60/326,294, entitled "Maintenance/Trouble Signals for a RF Wireless Locking System"; and Application No. 60/326,295, entitled "RF Dynamic Channel Switching Method."

FEDERALLY SPONSORED RESEARCH OR DEVELOPMENT

Not Applicable

MICROFICHE/COPYRIGHT REFERENCE

Not Applicable

BACKGROUND OF THE INVENTION

The preferred embodiments of the present invention relate to an RF access control system for controlling access to an access point. More specifically, the preferred embodiments of the present invention relate to a method and system for a cardholder interface for an access control system A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust that a single wire.

However, one difficulty often encountered in installing and maintaining such a wireless access system is the design and implementation of a cardholder interface to provide indications of the operation and/or state of the wireless access system to a user and/or technician.

Consequently, a wireless access system providing such indications would be highly desirable.

BRIEF SUMMARY OF THE INVENTION

A wireless access system including indicators for communicating the operation and/or status of the system to a user or technician is provided. The wireless access system preferably includes a cardholder interface. The cardholder interface preferably includes at least some of the following: visual display of firmware version number, LED indicator, beeper, card swipe indicator, access denial feature, and a request to enter feature.

DETAILED DESCRIPTION OF THE INVENTION

The present application is directed toward a portion of a wireless access system. Additional disclosure of the wireless access system may be found in the following co-filed applications which are hereby incorporated by reference in their entirety: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,196, entitled "System Management Interface for Radio Frequency Access Control" filed Sep. 30, 2002; application Ser. No. 10/262,194 entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RF Wireless Locking System" filed Sep. 30, 2002; and application Ser. No. 10/262,409, entitled "RF Dynamic Channel Switching Method" filed Sep. 30, 2002.

Figure 1:
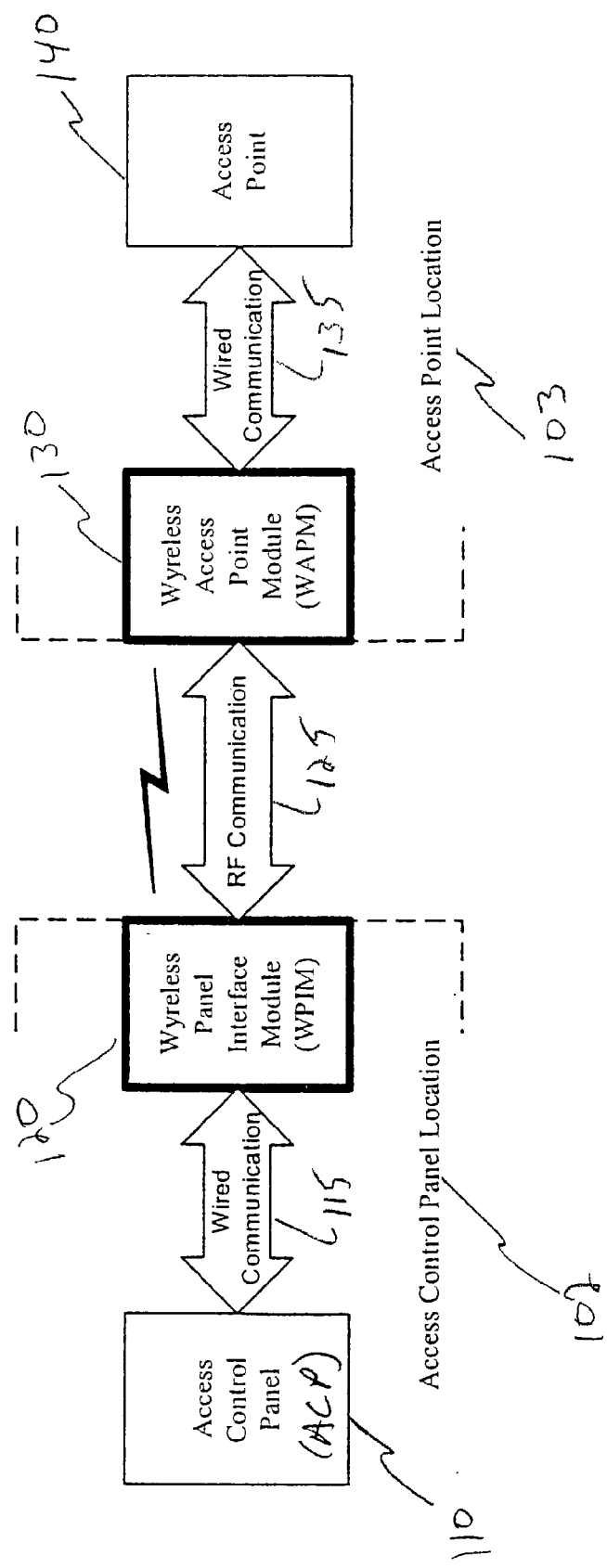
FIG. 1 illustrates a block diagram of the components of a wireless access system according to a preferred embodiment of the present invention.

FIG. 1 illustrates a block diagram of the components of a wireless access system 100 according to a preferred embodiment of the present invention. The wireless access system 100 includes several components installed at one of two generalized locations, an access control panel location 102 and an access point location 103. The access control panel location 102 includes an access control panel (ACP) 110 and a Wireless Panel Interface Module (WPIM) 120. The access point location 103 includes a Wireless Access Point Module (WAPM) 130 and an access point 140. The access control panel 110 communicates with the WPIM 120 through a bi-directional wired communication link 115. The WPIM 120 communicates with the WAPM 130 through a bi-directional RF communication link 125. The WAPM 130 communicates with the access point 140 through a bi-directional wired communication link 135. The access point 140 is preferably a door or portal, but may be a container, secure location, or a device of some kind, for example.

In operation, an access signal is read at the access point 140. The access signal may be a signal from an access card, for example, a magnetic stripe or Wiegand access card. Alternatively, the access signal may be a biometric or a numeric sequence or some other access signal. The access signal is relayed from the access point 140 to the WAPM 130 through the wired communication link 135. As further described below, the access point 140 may be integrated into the WAPM 130 to form a single component or may be a separate component wired to the WAPM 130.

Once the WAPM 130 receives the access signal from the access point 140, the WAPM 130 transmits the access signal to the WPIM 120 over the RF communication link 125. The WPIM 120 receives the access signal and relays the access signal to the ACP 110 over the wired communication link 115.

Figure 2:
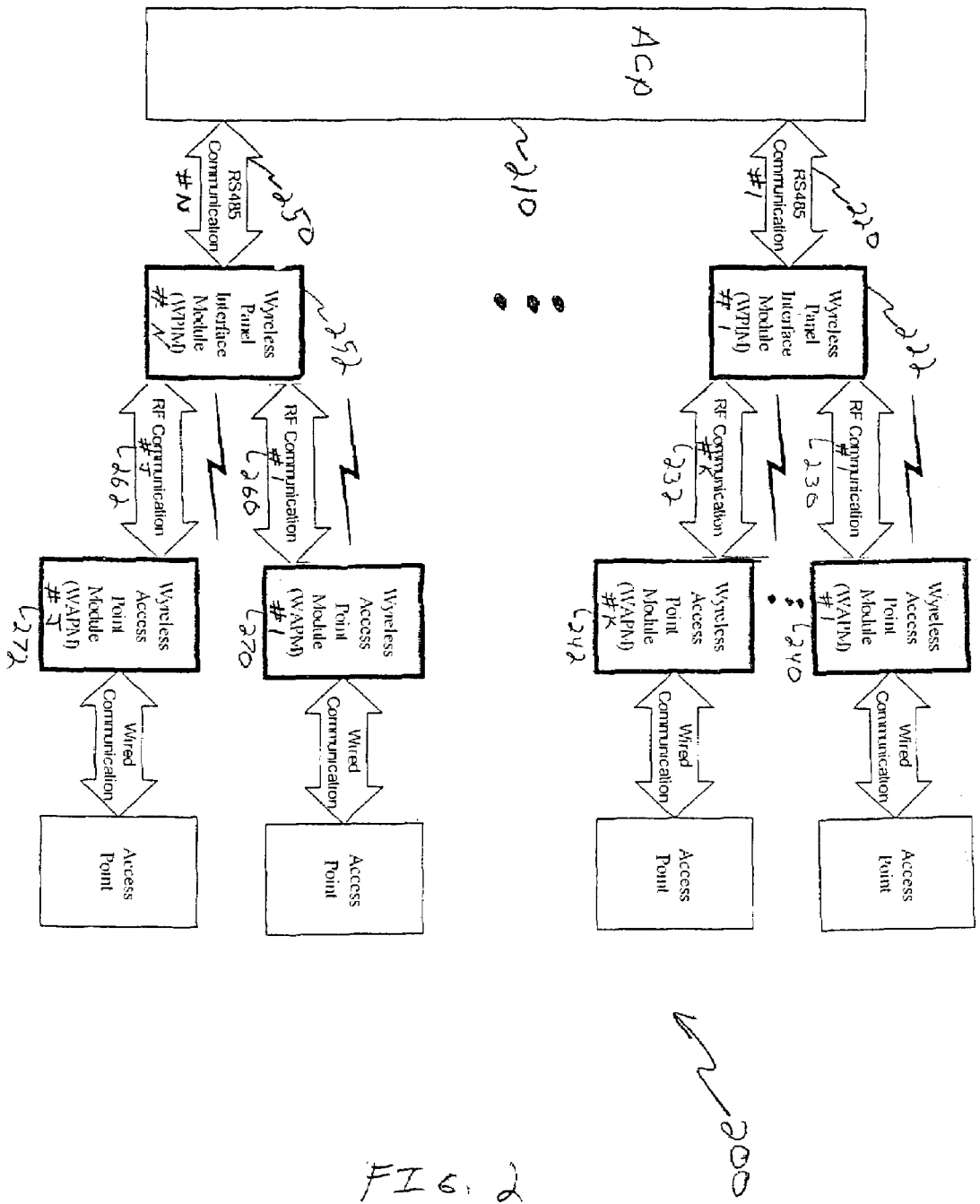
FIG. 2 illustrates a block diagram of the components of an expanded wireless access system according to a preferred embodiment of the present invention.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 2323, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

In the expanded wireless access system 200, a single ACP 210 communicates with a number N of WPIMs 222, 252 over a number N of wired communication links 220, 250. That is, the ACP supports communication with and provides access decisions for plurality of WPIMs 222, 252. Each WPIM 222, 252 may in turn support a plurality of WAPMs 240, 242, 270, 272 each WAPM positioned at a single access point. For example, WPIM #1 communicates with a number K of WAPMs 240, 242 over a number K of RF communication links 230, 232. Additionally, WPIM #N communicates with a number J of WAPMs 270, 272 over a number J of RF communication links 260, 262.

In a preferred embodiment, the ACP 210 supports three WPIMs and each PIM can support up to six WAPMs. However, as more advanced and configurable systems are developed, the total numbers of WPIMs and WAPMs supported is expected to rise. Additionally, the N wired communication links 220, 250 are illustrated as the preferred embodiment of RS486 communication links. Alternatively, other well-known communication protocols may be employed.

Figure 3:
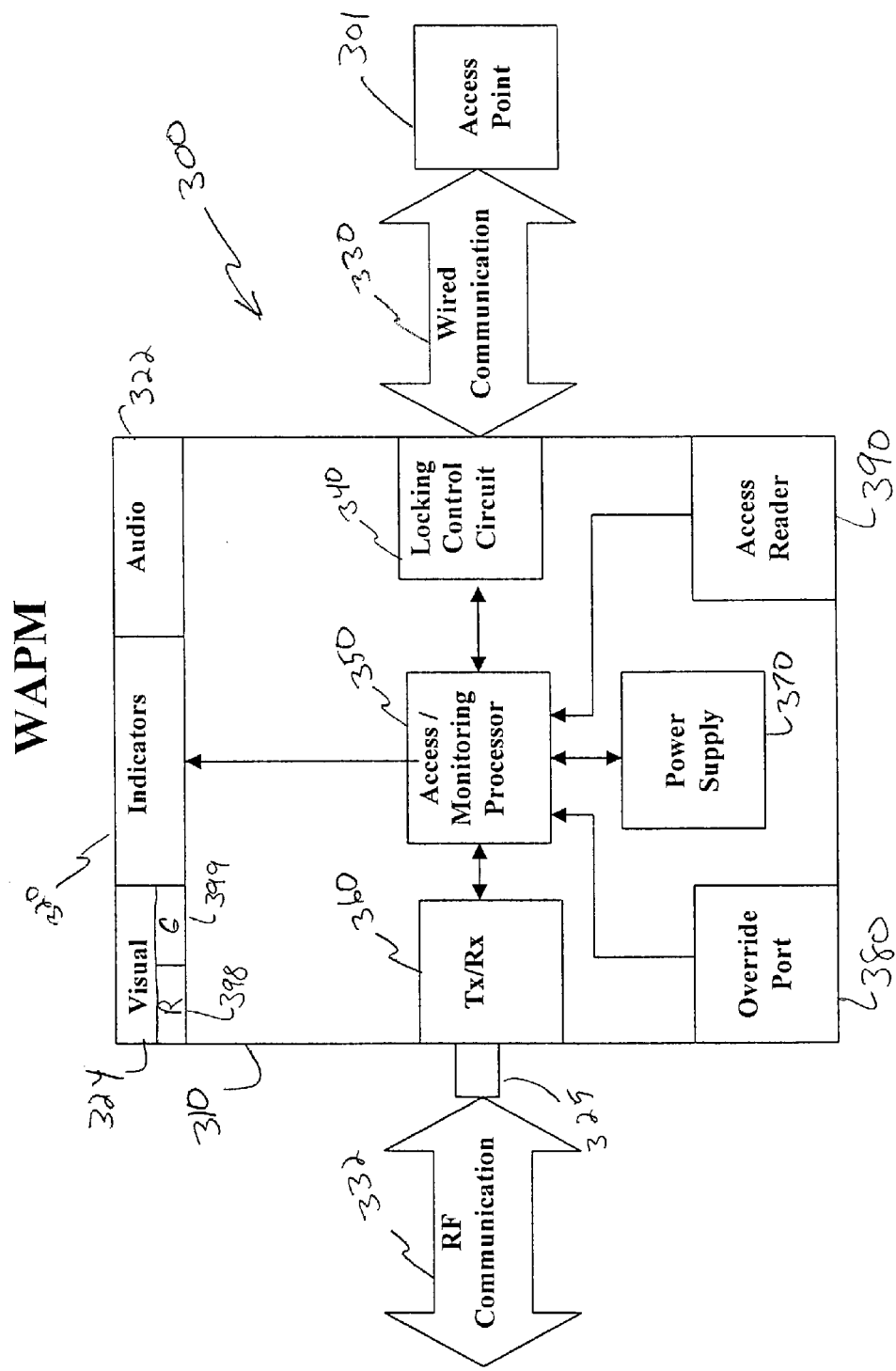
FIG. 3 illustrates a Wireless Access Point Module (WAPM) for the wireless access system of FIG. 1 according to a preferred embodiment of the present invention.

FIG. 3 illustrates a Wireless Access Point Module (WAPM) 300 for the wireless access system 100 of FIG. 1 according to a preferred embodiment of the present invention. The WAPM 300 includes a housing 310, indicators 320, a wired communication link 330, a RF communication link 332, and an antenna 325. The housing 310 includes a locking control circuit 340, an access/monitoring processor 350, a transceiver 360, a power supply 370, an override port 380, and an access reader 390. The indicators 320 may include one or both of an audio indicator 322 and a visual indicator 324. An access point 301 is also shown in FIG. 3.

The power supply 370 provides power to all of the other systems of the housing 310, including the transceiver 360, the locking control circuit 340, and the access/monitoring processor 350. The power supply 370 may be an internal battery or other internal type of power supply. Alternatively, an AC power supply may be employed. The transceiver 360 is coupled to the antenna 325 to allow signals to be sent and received from the housing 310 to an external point such as a WPIM through the RF communication link 332. The locking control circuit 340 is coupled to the access point 301 and provides locking control signals to the access point 301 through the wired communication link 330. Additionally, the locking control circuit 340 may receive feedback from the access point 301 through the wired communication link 330, for example to verify that the access point is secured. The access reader 390 receives access signals such as from an integrated card reader or other access device, for example. The indicators 320 may provide a visual or audio indication, for example, of the state of the WAPM 300 or that an access signal has been read by the access reader 390.

In operation, an access signal may be received from the access reader 390. The access signal is then relayed to the access/monitoring processor 350. The access/monitoring processor 350 then sends the access signal to the transceiver 360. The transceiver 360 transmits the access signal to WPIM 120 of FIG. 1 that is interfaced to the ACP 110. As further explained below, the ACP 110 includes a database of authorized access signals. If the access signal received from the WAPM 300 is determined by the ACP 110 to be a signal corresponding to an authorized user, a confirmation is transmitted from the ACP 110 to the WPIM 120 and then to the transceiver 360 of the WAPM 300. The confirmation is relayed from the transceiver 360 to the access/monitoring processor 350. The access/monitoring processor 350 then sends a locking control signal to the locking control unit 340. When the locking control unit 340 receives the locking control signal, the locking control unit 340 activates the access point 301 through the wired communication link 330 to allow access. The indicators 320 may be a visual or audible signal that the housing 310 has read an access signal, transmitted the access signal to the remote access control panel, received a confirmation, or activated the locking member, for example.

The WAPM 300 may include several variations. For example, the WAPM may be an Integrated Reader Lock (WAPM 300), a Wireless Reader Interface (WRI), a Wireless Integrated Strike Interface (WISI), a Wireless Universal Strike Interface (WUSI), or a Wireless Portable Reader (WPR). The WAPM 300 includes an integrated access reader and lock. That is, the WAPM 300 is similar to FIG. 3, but includes the access point as part of the housing. The WRI is similar to the WAPM 300, but does not include an integrated access reader and instead receives signals from a third party access reader. The WISI includes an integrated reader and lock and is mounted directly into the strike of the access point, such as a door, for example. The WUSI is similar to the WISI, but does not include an integrated reader and lock and may instead be connected to a third party reader and/or lock. The WPR is a portable reader that may be taken to a remote location and determine access decisions at the remote location, for example, for security checks or badging checks.

Figure 4:
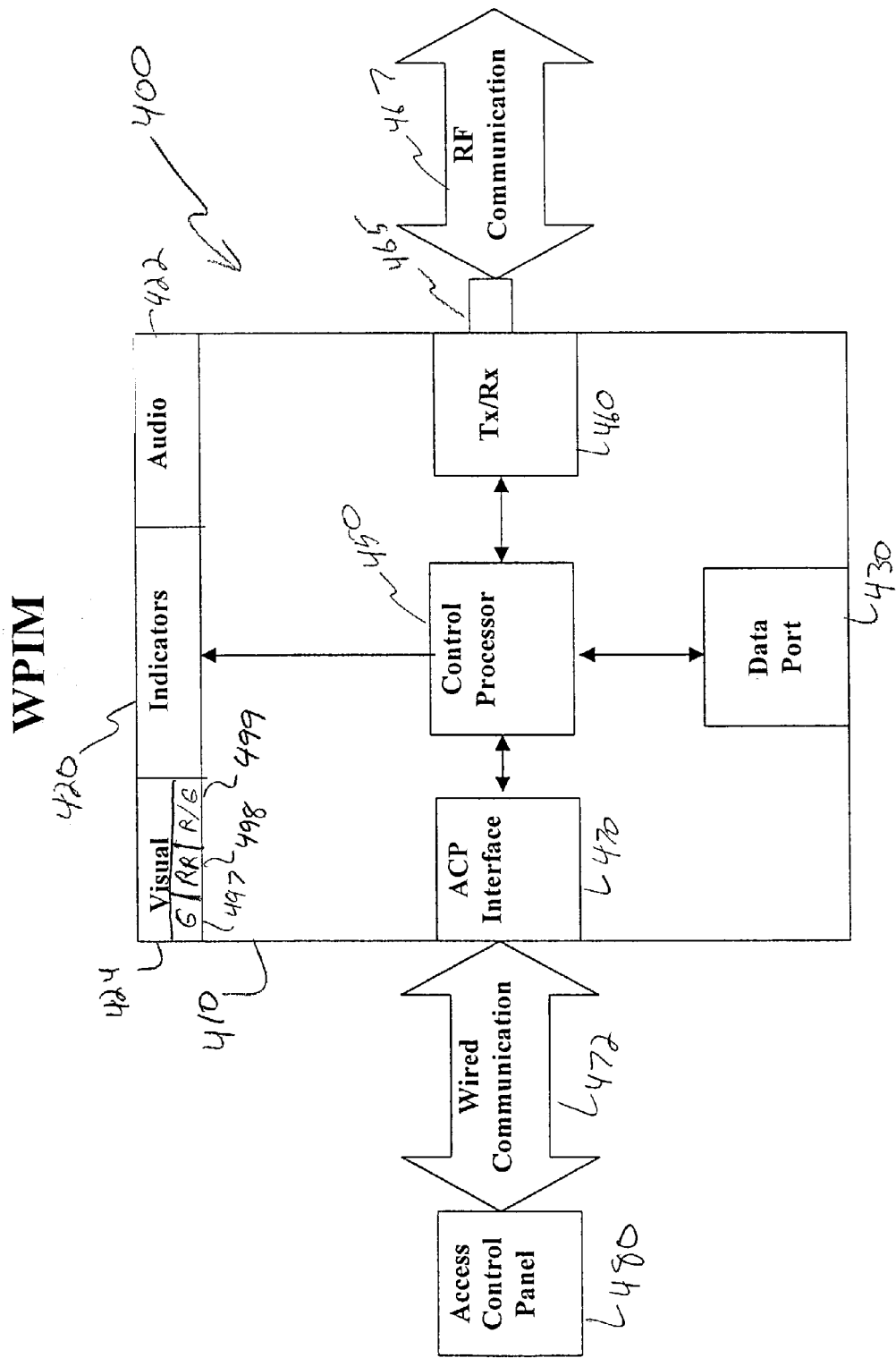
FIG. 4 illustrates a WPIM for the wireless access system of FIG. 1 according to a preferred embodiment of the present invention.

FIG. 4 illustrates a WPIM 400 for the wireless access system 100 of FIG. 1 according to a preferred embodiment of the present invention. The WPIM 400 includes a housing 410, an antenna 465, and indicators 420. The housing 410 includes a data port 430, a control processor 450, a transceiver 460 and an ACP interface 470. FIG. 4 also shows an RF communication link 467, a wired communication link 472, and an ACP 480.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual or audio indication, for example, of the state of the WPIM 400 or that an access signal has been passed to the ACP 480 or an authorization passed to a WAPM 300.

In operation, the WPIM 400 receives access signals from the WAPM 300 through the antenna 465 and transceiver 460. The WPIM relays the access signals to the ACP 480 for decision making. Once the access decision has been made, the ACP 480 transmits the access decision through the wired communication link 472 to the WPIM 400. The WPIM 400 then transmits the access decision to the WAPM 300.

As mentioned above, the WPIM 400 includes a data port 430. The data port 430 is preferably an RS485 port. The data port 430 may be used, for example, by an operator to connect a computer to the WPIM 400 to perform various tasks, such as configuring the WPIM 400, for example. Some exemplary WPIM items for configuration include the transmission frequency for the communication link with the WAPM and the performance of the indicators 420.

Additionally, configuration information may be received by the data port 430 of the WPIM 400 and relayed to the WAPM 300 via the transceiver 460. The configuration information that is received by the WAPM 300 may then by relayed to the access/monitoring processor 350 of the WAPM 300 for implementation at the WAPM 300.

The WPIM may include several variations including a panel interface module (PIM) and a panel interface module expander (PIME). As mentioned above, a single PIM may communicate with multiple WAPMs. Additionally, the housing for the PIM is preferably constructed to allow additional PIM modules to be installed in the PIM housing to form the PIME. Because the PIME includes multiple PIM modules, the PIME may service more access points.

Turning again to FIG. 3, the indicators 320 include an audio indicator 322 and a visual indicator 324. The visual indicator 324 includes a red LED 398 and a green LED 399. The indicators 120 may be any visual or audible signal that the wireless access system has read an access signal, transmitted the access signal to the remote access control panel, received a confirmation, or activated the locking member, for example, as further described below.

As mentioned above, the indicators may be visual or audible indicators and may be used to provide insight into the functioning of the components of the wireless access system, and the WAPM 300, in particular. In a preferred embodiment, the indicators display the current status of operation to a user of the WAPM 300.

The indicators preferably display the following elements of information:

1) The version of software employed by the WAPM 300. As is typically the case, the WAPM 300 is preferably released with a first version of software installed. However, the software and WAPM 300 are preferably upgradable so that improvements in function or user customization is available. Consequently, a service operator may need to know the software version installed on the WAPM 300, for example, to successfully decode the indicators. An indicator provides confirmation of the software version.

2) Whether the WAPM 300 is being re-locked. The WAPM 300 is re-locked when the locking control circuit 340 causes the access point 301 to lock. An indicator provides confirmation that the WAPM 300 is being re-locked.

3) A communications link request by the WAPM 300. When the WAPM 300 is first powered-up, the WAPM 300 establishes a communications link with a WPIM as described above. The first step in establishing the communications link is the WAPM 300 sending a communications request to the WPIM. An indicator provides confirmation that this signal is being sent.

4) A packet error test being performed by the WAPM 300. The next step in establishing communication between the WAPM 300 and the WPIM is to perform a packet error test over the communications link. An indicator provides confirmation that this test is occurring.

5) Establishment of a successful communication channel by the WAPM 300. Once the communication channels between the WAPM 300 and the WPIM has been established and verified, normal communications may occur. An indicator provides confirmation that this communications link has been established. Also, the indicator preferably indicates the channel over which communication has been established in a multi-channel system.

6) Whether an access signal has been read by the WAPM 300. Access requests may be periodically submitted to the WAPM 300. For example, a user may swipe a card reader at the access reader 190. An indicator provides confirmation that a card has been swiped. The indicator may be a visual blink, an audible tone, or both.

7) Whether the access signal was successfully received by the WAPM 300. Once an access request is submitted to the WAPM 300, the WAPM 300 interprets the access request and tries to read the data contained in the access request. For example, with regard to a card reader, first the card is swiped and then the WAPM 300 attempts to recognize the data on the card. An indicator provides confirmation that the data was successfully read from the card.

8) Whether the WAPM 300's communication link has been interrupted. The WAPM 300 also preferably indicates if its communications link with the remote access control panel or WPIM has been interrupted.

Additionally, the WPAM may periodically send signals to the WPIM and receive a confirmation signal from the WPIM to confirm that the communication channel between the WAPM and WPIM remains active. This periodic signal may be referred to as a heartbeat. The WAPM preferably indicates the failure of the WPIM to respond to the WAPM's heartbeat signal.

9) If access has been granted or denied. Once the access signal has been read by the WAPM 300 and then compared to the authorized access signals at the access control panel, and a decision has been sent from the WPIM to the WAPM 300, the WAPM 300 gives an indication that access has been granted or denied.

10) Additionally, the WAPM preferably indicates when the WAPM is experiencing an internal malfunction. For example, the WAPM may indicate that its motor has stalled. Additionally, the WAPM may be configured to sense when the door is closed. For example, a magnetic sensor may be mounted on the door jam and the door to sense when the door is closed. If the door is not closed for a certain length of time, the WAPM may preferably indicate the condition. Additionally, the WAPM may be equipped with a pre-alarm signal to provide an indication at the WAPM at a first time and then to later transmit the alarm to the WPIM at a second, later time if the door remains open. For example, at the first time, the WAPM may emit an audible tone signifying that the door is ajar.

As mentioned above, in a preferred embodiment, the indicators 320 are the red LED 398, green LED 399, and audible sound generator 322 as shown in FIG. 3. However, the indicators 320 may be any combination of visual and audible indicators or visual indicators alone or audible indicators alone.

Table 1 illustrates a preferred embodiment of the indicators 320 as implemented in the WAPM 300 of FIG. 3. As appreciated by those of skill in the art, numerous other combinations of visual and audible input (or visual input alone or audible input alone) may be substituted without departing from the teachings of the present embodiments.

As shown in Table 1, when the WAPM 300 is powered on, the red LED preferably blinks a number of times equal to the major version number of the software and the green LED preferably blinks a number of times equal to the minor version of the software. For example, if the software is version 2.4, the red LED blinks twice and the green LED blinks four times.

When the WAPM 300 relocks, the red LED flashes and the sound generator sounds a beep.

When the WAPM 300 sends a link request, the green LED flashes once and then the red LED flashes once.

When the WAPM 300 performs a packet error test, the WAPM 300 flashes green once for a good transmission and red once for a bad transmission.

When the WAPM 300 successfully establishes a link to a WPIM or remote access panel, the green LED flashes. Preferably, the green LED flashes a number of times equal to the number of the communication channel that the communication link occupies. For example, in a system having 15 possible communication links, the green LED blinks between once and 15 times to indicate the channel number. Additionally, the sound generator beeps a number of times equal to the channel number.

If the WAPM 300 is unable to establish a communication link, the WAPM 300 emits two red flashes and a long beep.

When an access signal is presented to the WAPM 300, for example, when a card is swiped, no indication is presented. Once the swiped card has been read, the sound generator preferably emits a beep. If access is denied, the WAPM 300 emits 2 red flashes and a single beep. If access is granted, the WAPM 300 emits a green flash.

If the WAPM 300 loses its communication link with the WPIM 400 or access control panel 110, the WAPM 300 emits a single red flash.

Turning again to FIG. 4, as with the WAPM above, the WPIM indicators 420 include an audio indicator 422 and a visual indicator 424. The visual indicator 424 preferably includes a single green LED 497, a pair of red LEDs 498, and a pair of LEDs that may display both red and green 499. As above, the indicators 420 may be any visual or audible signal, as further described below. The indicators 420 are preferably observed by a technician, for example at installation, and not by a normal user of the WPIM 400. The WPIM 200 also preferably interfaces to an access panel 110 and includes a housing door for access to the indicators and other elements of the WPIM 200.

As with the WAPM 300 above, the WPIM indicators 420 preferably indicate numerous conditions. These include:

1) Whether the WPIM is in normal operation. An indicator provides confirmation the operation of the WPIM is proceeding normally.

2) Whether the WPIM's housing door is open. An indicator provides confirmation the WPIM's housing door is open or closed (e.g., a tamper signal).

3) Whether the WPIM or any of the WAPMs 300 that are linked to the WPIM are experiencing trouble. An indicator provides confirmation that the WPIM and/or WAPM 300 are experiencing trouble and preferably also provides information as to the type of trouble encountered. For example, the WPIM or WAPM may be experiencing a low battery level, not receiving communication, have been tampered with, or have received a notification from an WAPM that the WAPM's motor has stalled.

4) Whether the WPIM is in link mode A or link mode B. In a preferred embodiment, each WPIM is linked to two WAPMs, however, the WPIM is not constrained to link with only two WAPMs. When linked with two WAPMs, the WPIM designates one WAPM as A and the other WAPM as B. When the WPIM is initially linking to a WAPM it is in link mode. Thus, for example, the initial linking with WAPM A defines a link mode A.

5) Whether the WPIM is participating in a packet error test. As mentioned above, the WPIM and WAPM 300 conduct a packet error test when the WAPM 300 is powered up or re-linked. An indicator provides confirmation that the packet error test is being performed.

6) Whether the WPIM is transmitting or receiving a message. As mentioned above, in a preferred embodiment, the indicators include a single green LED 497, a pair of red LEDs 498, and a pair of LEDs that may display both red and green 499 as shown in FIG. 4.

Table 2 illustrates a preferred embodiment of the indicators 420 as implemented in the WPIM 200 of FIG. 2. As appreciated by those of skill in the art, numerous other combinations of visual and audible input (or visual input alone or audible input alone) may be substituted without departing from the teachings of the present embodiments.

As shown in Table 2, when the WPIM is in normal operation and the access panel is closed, the green LED 497 blinks continuously and the green/red LEDs 499 are green.

When the access panel is opened, the green LED 497 stays on and the green/red LEDs 499 are green. If the WPIM is not powered on, the green LED 497 stays off and all other LEDs are off.

If the WPIM 200 is experiencing trouble, the red LEDs 498 blink, the green LED 497 is on, and the green/red LEDs 499 are green. The number of blinks in a sequence is used to indicate the specific type of trouble that the WPIM is experiencing. If the sequence is one blink long, the WPIM is experiencing a low battery condition. If the sequence is two blinks long, the WPIM is not receiving communication from an WAPM. If the sequence is three blinks long, the WAPM's reader has been tampered with. If the sequence is four blinks long, the WPIM has received a signal from an WAPM that the WAPM's lock motor has stalled.

When the WPIM is communicating in link modes A or B, the green LED 497 is blinking, the red LEDs 498 are off, and the green/red LEDs 499 flash green and red.

When the WPIM is engaged in a packet error test, the green LED 497 is blinking, the red LEDs 498 are off, and the green/red LEDs 499 flash green and red. That is, the green/red LEDs flash green on each error-free transmission and flash red on any transmission including an error.

When the WPIM is transmitting a message, the green LED 497 is blinking, the red LEDs 498 are off, and the green/red LEDs 499 flash red once for each message.

When the WPIM 200 is receiving a message, the green LED 497 is blinking, the red LEDs 498 are off, and the green/red LEDs 499 blink off momentarily.

Additionally, one of the preferred embodiments of the present invention includes a request to enter feature. The request to enter may be either an access signal such as a card read, or the request to enter may be an input such as a switch mounted on the WAPM 300. The switch is preferably connected to the secured side (outside) of the WAPM 300. The request to enter switch may be used, for example, to indicate that someone is trying to gain access through the WAPM 300. That is, to indicate that someone wishes to gain access through the door.

The request to enter feature is similar to a doorbell, but may include the activation of a camera for observing the person seeking to gain entrance, or may trigger an interior buzzer or an audible or visual prompt on an interior access interface.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

TABLE 1

| | Action | LED Indication | WAPM 300 Sounder |
|---|---|---|---|
| 1a | WAPM 300 is powered and then displays software version number | X red flashes then Y green flashes to show SW version # | none |
| 1b | WAPM 300 Relocks (motor runs) | 1 red flash | 1 beep |
| 1c | Then, WAPM 300 sends a link request (up to 3 times on each RF channel) looking for a WPIM in link mode | 1 green flash; then 1 red flash once for each link request sent | none |
| 1d | Then, WAPM 300 & WPIM do an Packet-Error-Rate test for about 20 seconds | flashes for each RF transmission: green flash for a good transmission red flash for a bad transmission | none |
| 1e | Then, WAPM 300 linked successfully and indicates the RF Channel on which it linked | Z green flashes* | Z beeps* |
| 1f | Or, WAPM 300 not linked successfully | 2 red flashes | 1 long beep |
| 2 | Card swiped and not read | none | none |
| 3 | Card swiped and read | none | 1 beep |
| 4 | No communications | 1 red flash - immediate | none |
| 5 | Access denied | 2 red flashes - delayed about 1 second | 1 beep |
| 6 | Access granted, WAPM 300 unlocks (motor runs) | 1 green flash | none |
| 7 | WAPM 300 Relocks (motor runs) | 1 red flash | 1 beep |

X = major software version number (any number is possible)
Y = minor software version number (any number is possible)
Z = RF channel number that the WAPM 300 linked on (1-15)

TABLE 2

| | Condition | | LED Indication | | |
|---|---|---|---|---|---|
| | | | CR 15 (green) | CR 7, 10 (red) | CR 6, 9 (green–red) |
| 1 | Normal operation, WPIM is powered & the microprocessor is running | Tamper On (Door Open) | blinking | NA | green |
| | | Tamper Off | on | NA | green |

TABLE 2-continued

| | LED Indication | | |
|---|---|---|---|
| Condition | CR 15 (green) | CR 7, 10 (red) | CR 6, 9 (green–red) |
| 2 WPIM is not powered or WPIM is defective | off | NA | NA |
| 3 Trouble: Low Battery | on | 1 blink | green |
|    Trouble: No Communication | | 2 blinks | |
|    Trouble: Reader Tamper | | 3 blinks | |
|    Trouble: Lock Motor Stall | | 4 blinks | |
| 4 Link Mode A | blinking | NA | CR6 flash green & red |
| 5 Link Mode B | blinking | NA | CR6 flash green & red |
| 6 Packet-Error-Rate test during linking | blinking | NA | Grn flash on every good transmission- Red flash on any bad transmission. Goes on for about 20 seconds. |
| 7 Transmitting a Message | blinking | NA | 1 red flash per transmission |
| 8 Receiving a Message | blinking | NA | blinks off momentarily |

The invention claimed is:

1. In an RF access control system, a method for providing indications of the state of a Wireless Access Point Module (WAPM) to an observer, said WAPM having at least one indicator and fixedly positioned adjacent a single access point, said method including the steps of: providing an indication of the version of software installed on said WAPM using said at least one indicator.

2. The method of claim 1 wherein said WAPM includes a lock, said method further including the step of providing an indication that said lock is relocking.

3. The method of claim 1 further including the step of providing an indication that said WAPM is sending a link request looking for a WPIM.

4. The method of claim 1 further including the step of providing an indication that said WAPM is engaged in an error test with a WAPM.

5. The method of claim 1 further including the step of providing an indication that said WAPM has successfully linked with a WPIM.

6. The method of claim 1 further including the step of providing an indication that said WAPM has not received communication from a WPIM within a specified time interval.

7. In an RF access control system, a method for providing indications of the state of a Wireless Access Point Module (WAPM) to an observer, said WAPM having at least one indicator and fixedly positioned adjacent a single access point, said method including the steps of:
providing an indication of the version of software installed on said WAPM using said at least one indicator, wherein said WAPM receives data from a card reader, said method further including the step of providing an indication that said WAPM has received data form a card reader.

8. The method of claim 7 further including the step of providing an indication that said WAPM does not understand data received from said card reader.

9. The method of claim 7 further including the step of providing an indication that access through the WAPM has been granted in response to said data from said card reader.

10. The method of claim 7 further including the step of providing an indication that access through the WAPM has been denied in response to said data from said card reader.

11. An RF access control system for controlling access to an access point, the control system including:

an access control panel operable to make access decisions for the access point;

a wireless panel interface module (WPIM) in communication with the access control panel and including a transceiver operable to send and receive access signals; and a Wireless Access Point Module (WAPM) fixedly positioned adjacent the access point and in communication with the wireless panel interface module, said WAPM having installed software, said WAPM providing an indication to an observer of the version of software installed on said WAPM using said at least one indicator.

12. The system of claim 11 further including: a lock for securing said WAPM, wherein said at least one indicator provides an indication that said lock is relocking.

13. The system of claim 11, wherein said at least one indicator provides an indication that said WAPM is sending a link request looking for said WPIM.

14. The system of claim 13 wherein said at least one indicator provides an indication that said WAPM is engaged in an error test with said WPIM.

15. The system of claim 13 wherein said at least one indicator provides an indication that said WAPM has successfully linked with said WPIM.

16. The system of claim 13 wherein said at least one indicator provides an indication that said WAPM has not received communication from said WPIM within a specified time interval.

17. An RF access control system for controlling access to an access point, the control system including:

an access control panel operable to make access decisions for the access point;

a wireless panel interface module (WPIM) in communication with the access control panel and including a transceiver operable to send and receive access signals;

a Wireless Access Point Module (WAPM) fixedly positioned adjacent the access point and in communication with the wireless panel interface module, said WAPM having installed software, said WAPM providing an indication to an observer of the version of software installed on said WAPM using said at least one indicator; and a card reader, said card reader providing data to said WAPM, wherein said at least one indicator provides an indication that said WAPM has received data from a card reader.

18. The system of claim 17 wherein said at least one indicator provides an indication that said WAPM does not understand data received from said card reader.

19. The system of claim 17 wherein said at least one indicator provides an indication that access through the WAPM has been granted in response to said data from said card reader.

20. The system of claim 17 wherein said at least one indicator provides an indication that access through the WAPM has been denied in response to said data from said card reader.

* * * * *